US012347962B2

(12) United States Patent
Willson

(10) Patent No.: US 12,347,962 B2
(45) Date of Patent: Jul. 1, 2025

(54) ELECTRICAL SAFETY PLUG

(71) Applicant: Walmart Apollo, LLC, Bentonville, AR (US)

(72) Inventor: Adrian Willson, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 179 days.

(21) Appl. No.: 18/157,823

(22) Filed: Jan. 21, 2023

(65) Prior Publication Data

US 2023/0155314 A1 May 18, 2023

Related U.S. Application Data

(63) Continuation-in-part of application No. 17/145,693, filed on Jan. 11, 2021, now Pat. No. 11,588,267.

(60) Provisional application No. 62/962,413, filed on Jan. 17, 2020.

(51) Int. Cl.
*H01R 13/443* (2006.01)
*H01R 13/66* (2006.01)
*H01R 13/717* (2006.01)

(52) U.S. Cl.
CPC ....... *H01R 13/443* (2013.01); *H01R 13/6683* (2013.01); *H01R 13/7175* (2013.01)

(58) Field of Classification Search
CPC ....... B23B 47/287; B23B 39/26; B23B 49/02; B23B 2215/04; B23B 2247/12; B23Q 35/12; G05B 19/19; B25H 7/02
See application file for complete search history.

(56) References Cited

U.S. PATENT DOCUMENTS 3,868,160 A 2/1975 Kersman
4,930,997 A * 6/1990 Bennett .................. A61M 1/84 604/319
6,794,575 B1 * 9/2004 McBain .............. H01R 13/447 174/67
6,986,674 B1 * 1/2006 Gorman .............. H01R 25/006 439/911
8,226,424 B1 * 7/2012 Wang ..................... H01R 31/06 439/172
10,522,936 B2 12/2019 Martin
(Continued)

FOREIGN PATENT DOCUMENTS

CN 2288520 Y 8/1998
CN 212542827 U 2/2021

OTHER PUBLICATIONS

Topping, Will et al., Magnoplug—"Electricity mad: Smart, Simple and Safe", Kickstarter, https://www.kickstarter.com/projects/magnoplug/magnoplug-the-electrical-plug-evolved, captured Feb. 4, 2020, pp. 1-16.

(Continued)

*Primary Examiner* — Jermele M Hollington
*Assistant Examiner* — Zannatul Ferdous
(74) *Attorney, Agent, or Firm* — Foley IP Law, PLLC

(57) ABSTRACT

A safety plug for an electrical outlet, including an electrically nonconductive plug body. An adapter is removably coupled to a first end of the electrically nonconductive plug body. The adapter includes a set of pins. The set of pins correspond to a set of pin connector slots associated with an electrical outlet. The safety plug is a dummy plug configured to keep the electrical outlet covered to protect from electrical discharge.

14 Claims, 18 Drawing Sheets

(56) References Cited

U.S. PATENT DOCUMENTS

| | | | | |
|---|---|---|---|---|
| 10,622,768 | B1 * | 4/2020 | Cowham | H01R 24/28 |
| 10,840,658 | B1 * | 11/2020 | Glahe | H01R 31/06 |
| 11,203,462 | B1 * | 12/2021 | Ulla | B65D 23/108 |
| 11,289,883 | B1 | 3/2022 | Krenz | |
| 2009/0160427 | A1 * | 6/2009 | Drake | G01R 19/16566 324/72 |
| 2011/0294318 | A1 * | 12/2011 | Malek | H01R 27/00 439/101 |
| 2015/0111411 | A1 * | 4/2015 | Berry, III | H01R 24/76 439/362 |
| 2018/0041072 | A1 | 2/2018 | Clifton et al. | |
| 2018/0219341 | A1 * | 8/2018 | Blair | H01R 13/622 |
| 2019/0305463 | A1 | 10/2019 | Gibbon | |

OTHER PUBLICATIONS amazon.com, “Acouto 125cm / 49.2in Ignition Key Switch & Safety Lanyard for Johnson Evinrude Boat 5005801”, https://www.amazon.com/Acouto-Ignition-Lanyard-Johnson-Evinrude/dp/B07HMZPTQY, captured Feb. 4, 2020, 3 pages.

amazon.com, “Acouto Universal Engine Stop Kill Tether Switch Lanyard for ATV Racing Emergency”, https://www.amazon.com/Acouto-Universal-Engine-Lanyard-Emergency/dp/B07K67N45F?ref_=ast_bbp_dp, captured Feb. 4, 2020, 1 page.

amazon.com, “Sea Dog 420488-1 Kill Switch with Lanyard”, https://www.amazon.com/Sea-Dog-420488-1-Switch-Lanyard/dp/B00DH3QHBI, captured Feb. 4, 2020, 1 page.

* cited by examiner

ELECTRICAL SAFETY PLUG

BACKGROUND

Refrigerated display cases and freezer cases used for storing perishable items typically include a removable bottom member, below which is located a fan plugged into an electrical outlet attached to an electrical harness. During cleaning and/or servicing of the display case and fan, the fan or other electrical devices inside the case are unplugged from the electrical outlet. During this time, the end of the outlet is exposed inside the case during the cleaning process, which could cause an electrical hazard to those near it. In addition, the exposed electrical outlet connection slots can become filled with water during the cleaning process and pose a shock safety risk.

While performing cleaning or maintenance, the user unplugs the electrical devices inside the case and attempts to work around or otherwise avoid contacting the outlet, which is typically resting on the bottom interior portion of the case (base) with water, cleaning equipment or the user's hands during cleaning. However, it can frequently be difficult and/or cumbersome for a user to clean around the electrical outlet while also avoiding contact with the electrical harness.

SUMMARY

Some examples provide an electrical safety plug including an electrically nonconductive plug body having a set of pins associated with a first end of the plug body and a tether connected to a second end of the plug body at an attachment point. The set of pins configured to conform to a set of pin connector slots associated with an electrical harness including an electrical outlet. A tether connection aperture associated with an anchor couple. The tether is at least partially threaded through the tether connection aperture. The anchor couple includes a first inter-locking device removably attached to a second inter-locking device associated with a return couple. An attachment member connected to the return couple via an attachment connector aperture associated with at least a portion of the return couple.

Other examples provide a method for performing maintenance using an electrical safety plug. A first interlocking device disengages from a second interlocking device to separate an anchor couple from a return couple. A set of pins associated with a first end of a nonconductive plug body inserts into a set of pin connector slots associated with an electric plug. The nonconductive plug body is attached to the anchor couple via a tether. At least one end of the tether is connected to a second end of the plug body. The anchor couple attaches to at least a portion of a member of a case via the first interlocking device creating tension in the tether. The tension pulls an electrical harness associated with the nonconductive plug body in a direction of an attachment point of the tether. The nonconductive plug body covers the set of pin connection slots and the tether pulls the electrical harness away from a base member.

Still other examples provide an electrical safety plug capable of being secured during performance of a task. An electrical outlet includes one or more pin connector slots. An electrical safety plug includes a nonconductive plug body having one or more pins conforming to the one or more pin connector slots. The one or more pins associated with a first end of the nonconductive plug body. A tether connects to a second end of the nonconductive plug body at one or more attachment points. A tether connection aperture associated with an anchor couple. The tether is at least partially threaded through the tether connection aperture. The anchor couple includes an interlock device anchoring the anchor couple to at least a portion of a member of a display case.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
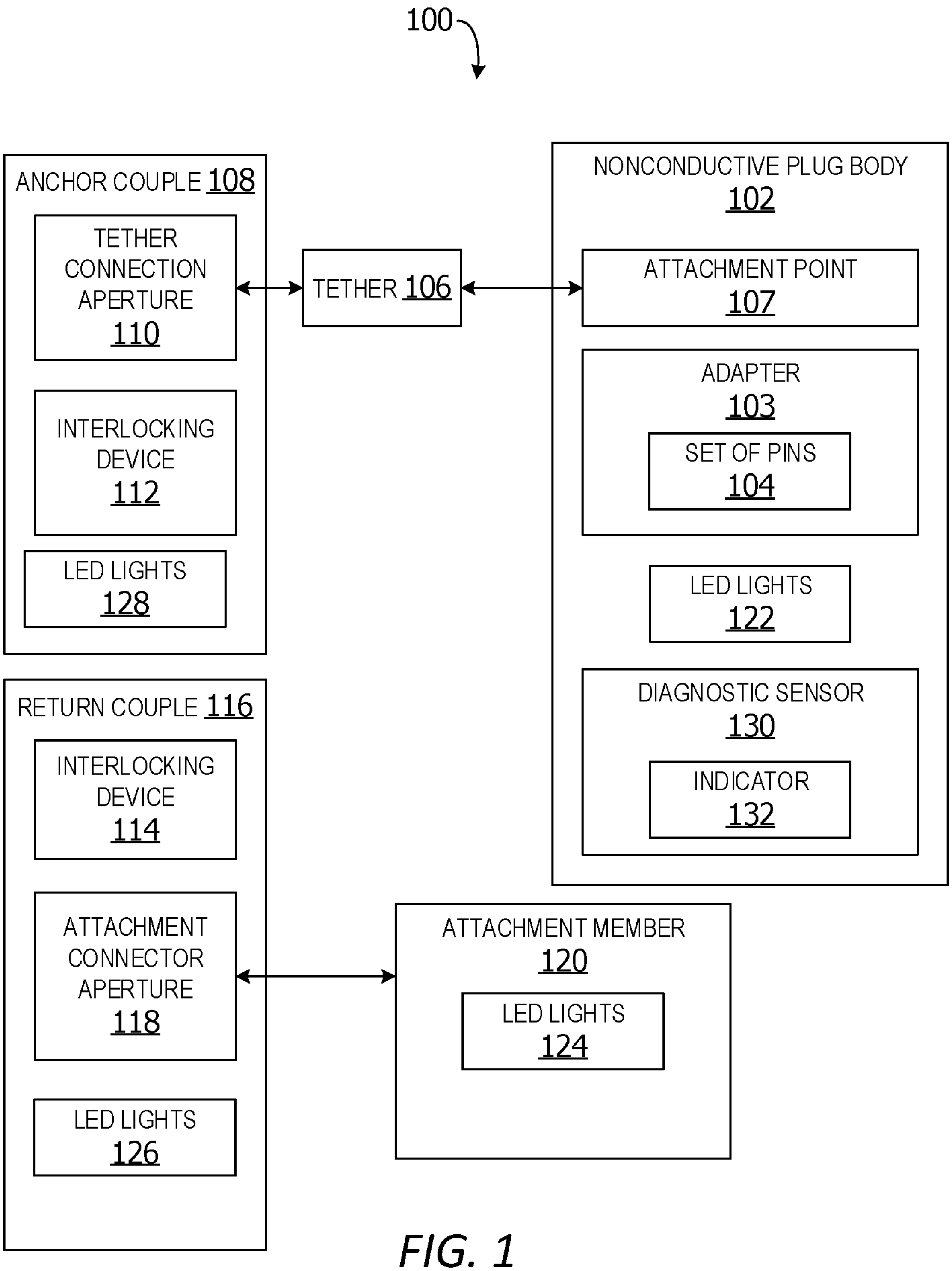
FIG. 1 is an exemplary block diagram illustrating an electrical safety plug.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable an electrical safety plug for engaging an electrical outlet during a cleaning operation or other service to protect a user performing the cleaning or service task from electrical shock, injury, or discomfort. In some examples, a set of couplers connect a dummy plug on a tether to an attachment member via a set of interlocking devices. This enables the anchor couple to grip or attach to a side wall while engaged with an electrical wiring harness associated with the electrical outlet. The anchor couple and tether lift or elevate the wiring harness above a bottom surface or other base member during the performance of the cleaning or other maintenance task. This simplifies the task, keeping the electric outlet away from water being sprayed during cleaning and protecting the user from electrical discharge from the outlet. It further holds the wiring in position along the side wall or along the base (bottom) member so the user can clean the case without the outlet or wiring getting in the way.

Other aspects of the disclosure further enable a dummy electrical safety plug that attaches to the electrical harness when the fan or other equipment is unplugged or otherwise disconnected. In some examples, when the safety plug is not in use, a return coupler attaches the safety plug to a cleaning cart, maintenance tool or other device via a magnet or set of magnets tethered to the plug. This enables more efficient management of the safety plug while increasing user safety during maintenance.

In other examples, the electrical safety plug covers the end of a refrigeration case electrical supply harness to prevent user contact with the live outlet and prevent water entering the outlet during maintenance operations. Maintenance operations can include disassembly, cleaning, replacing parts, performing diagnostic testing, or other maintenance tasks. Cleaning can include washing with water, cleaning with solvents, wiping down, drying, or other tasks to improve cleanliness of the case, equipment/parts inside the case, or areas within the case. This ensures the safety of those working on or near the harness during service or cleaning operations for reduced injuries and greater case cleaning efficiency.

FIG. 1 is an exemplary block diagram illustrating an electrical safety plug 100. The electrical safety plug 100 includes a nonconductive plug body 102 having a set of one or more pins 104. The nonconductive plug body 102 is a dummy plug which does not conduct electricity. The set of pins 104 includes one or more pins configured to fit within each slot in the set of slots of a female end of an electrical outlet. The set of pins can include a single pin, a pair of two pins, a set of three pins or any other number of pins. In some examples, the set of pins 104 are interchangeable, such that a user can remove an adapter 103 portion of the nonconductive plug body 102 and replace it with a different adapter portion having a different number of pins conforming to a different number of slots in the female end of a different outlet. In other words, the user can interchange or replace the set of pins by replacing an adapter member on the nonconductive plug body 102.

A tether 106 is connected to one end of the nonconductive plug body at an attachment point 107. The attachment point 107 is the portion of the plug body at which at least one end of the tether is connected to the plug body. One end or both ends of the tether can be connected to the plug body at the attachment point 107 by bonding, gluing, or otherwise adhering the tether to the plug body. In other examples, the end of the tether is integrated into the plug body, wherein at least a portion of the end of the tether is at least partially embedded within the plug body.

The set of pins 104 are connected to the other (opposing) end of the nonconductive plug body opposite to the attachment point 107 at which the tether 106 attaches to the nonconductive plug body. The tether 106 can be implemented as a string, nylon, rope, wire encased within a nonconductive outer coating, or any other type of tether.

The tether 106 is connected to an anchor couple 108 via a tether connection aperture 110. The tether connection aperture 110 is an opening defined by the body of the anchor couple 108. The tether 106 loops through the aperture to connect the anchor couple 108 to the nonconductive plug body 102.

The tether 106, in some examples, is a lanyard having a length within a range from six inches to eighteen inches. In other examples, the length of the tether is a user-configurable length depending on the configuration or depth of the case being cleaned. In an example, the user can add additional length of tether to the pre-existing tether 106 to extend or increase the length of the tether connecting the anchor couple to the plug body. The plug body having the set of pins may also be referred to as a dummy plug.

In still other examples, the tether is extendable and/or retractable such that the length of the tether is variable during usage depending on whether the tether is fully extended, partially extended, fully retracted and/or partially retracted within a housing associated with the safety plug. In an example, the tether is a retractable lanyard on an extendible rolling lanyard. At least one end of the tether connects to the plug body at the attachment point 107 and at least a portion of the tether connects to the anchor couple. The tether can connect to the anchor couple by threading through an aperture on the anchor couple. When pulled taut, such as when attached to a side wall, base member or other object, tension is created along the length of the tether to move, pull, lift or otherwise assist in holding the electrical harness out of the workspace where the user is cleaning or performing other maintenance or repair tasks.

The anchor couple 108 connects to a corresponding return couple 116 via an interlocking device 112 on the anchor couple 108 which removably connects to an interlocking device 114 on the return couple 116. In some examples, the anchor couple 108 and/or the return couple is implemented as a main body composed of polymer, wood, rubber, vinyl, polyvinyl chloride (PVC), or any other nonconductive material.

The interlocking device 112 is a device for removably connecting to the interlocking device 114. In some examples, the interlocking device 112 and the interlocking device 114 are magnets having opposing poles that attract to each other. In other examples, the interlocking device 112 and the interlocking device 114 are threaded devices which connect when the interlocking device 112 is aligned with the interlocking device 114 and rotated either clockwise or counterclockwise to thread the interlocking devices together. In still other examples, the interlocking device 112 and the interlocking device 114 include hook-and-loop fasteners which removably attach to each other. The interlocking device 112 and the interlocking device 114 in still other examples snap together, click together, latch or otherwise removably connect.

An attachment member 120 may be threaded through an attachment connector aperture 118, in other examples. The attachment connector aperture 118 is a hole defined by the return couple 116 body. The attachment member 120 is a device for connecting the electrical safety plug 100 to a cleaning cart, a maintenance tool, supply belt, ladder, fixture, structure or device. In this non-limiting example, the attachment member attaches to a cleaning cart or caddy. The attachment member connects to a cart, tool, ladder, belt, caddy, structure, fixture, or device by hanging on a hook, being clipped onto a ring, snapping on, or otherwise removably attaching to a portion or member of the object to which the attachment member is attaching to secure the electrical safety plug to the object.

In some examples, the attachment member 120 is some examples is a tether, such as the tether 106. The tether attachment member, in these examples, can be implemented as a nonconductive material, such as string, nylon, rope, cord, insulated wire, or any other flexible type of connector. The attachment member 120, in other examples, is implemented as a non-flexible ring or hook. The attachment member 120, in these examples, may be composed of metal, plastic, composite material or any other suitable substance. In still other examples, the attachment member 120 is implemented as a suction device, a clip, a ring, loop, hook, or any other type of device for attaching the electrical safety plug to a cleaning cart or other device. The suction device is a device for attachment by creating a suction, such as, but not limited to, one or more suction cups.

The color of the nonconductive plug body 102, in some examples, is an orange color or other bright color which is easily noticed (stands out) to alert the user that it is a dummy plug. Other colors could include red, blue, yellow or other bright colors. However, the examples are not limited to the colors listed herein. The plug body may be any color desired by the user in other examples.

In some examples, the electrical safety plug includes a light, such as, but not limited to, a light emitting diode (LED) light or a set of one or more LED lights. The light includes an off and on switch. The user activates the on switch to activate the light. The light can assist the user while working in a partially enclosed or poorly lit area. The one or more LED lights may be attached to one or more elements of the electrical safety plug. For example, LED lights 122 implemented on nonconductive plug body 102, LED lights 124 implemented on attachment member 120, LED lights 126 implemented on return couple 116 and/or LED lights 128 implemented on anchor couple 108. FIG. 1 is provided for illustrative purposes and should not be construed as limiting in any way. Although LED lights are illustrative provided on more than one element in FIG. 1, LED lights may be implemented on fewer elements or no elements in some embodiments. In still other examples, the one or more LED lights are removably attached to one or more elements of the electrical safety plug.

In other examples, the electrical safety plug includes one or more diagnostic sensors, such as diagnostic sensor 130 implemented on nonconductive plug body 102. A diagnostic sensor includes, for example, but without limitation, a voltmeter, an ammeter, an ohm meter, or other sensors for detecting whether the outlet is a live outlet having a live power source connected to it or a dead outlet, an amount of voltage running through the electrical harness, etc.

In an example scenario, when the set of pins of the safety plug is inserted into the set of pin connector slots of an electrical outlet, an indicator 132 communicatively coupled to diagnostic sensor 130 on the electrical safety plug indicates whether the outlet is live (current present) or dead (no current). An outlet may be dead if there is no power source feeding electric current to the outlet. If the outlet is live, the safety plug may remain engaged with the outlet and the anchor couple is attached to the side wall or base member of the case to be cleaned. The tension on the tether connecting the anchor couple to the dummy plug pulls or partially lifts the electrical harness and safety plug away from an area where the user is working (performing maintenance). Maintenance may include cleaning, repairing, etc. The area where the user is working may be at or near the original location of the outlet. In other examples, the user secures the anchor couple to the base member to prevent the electrical harness from shifting, sliding or otherwise moving (becoming displaced) during cleaning.

Figure 2:
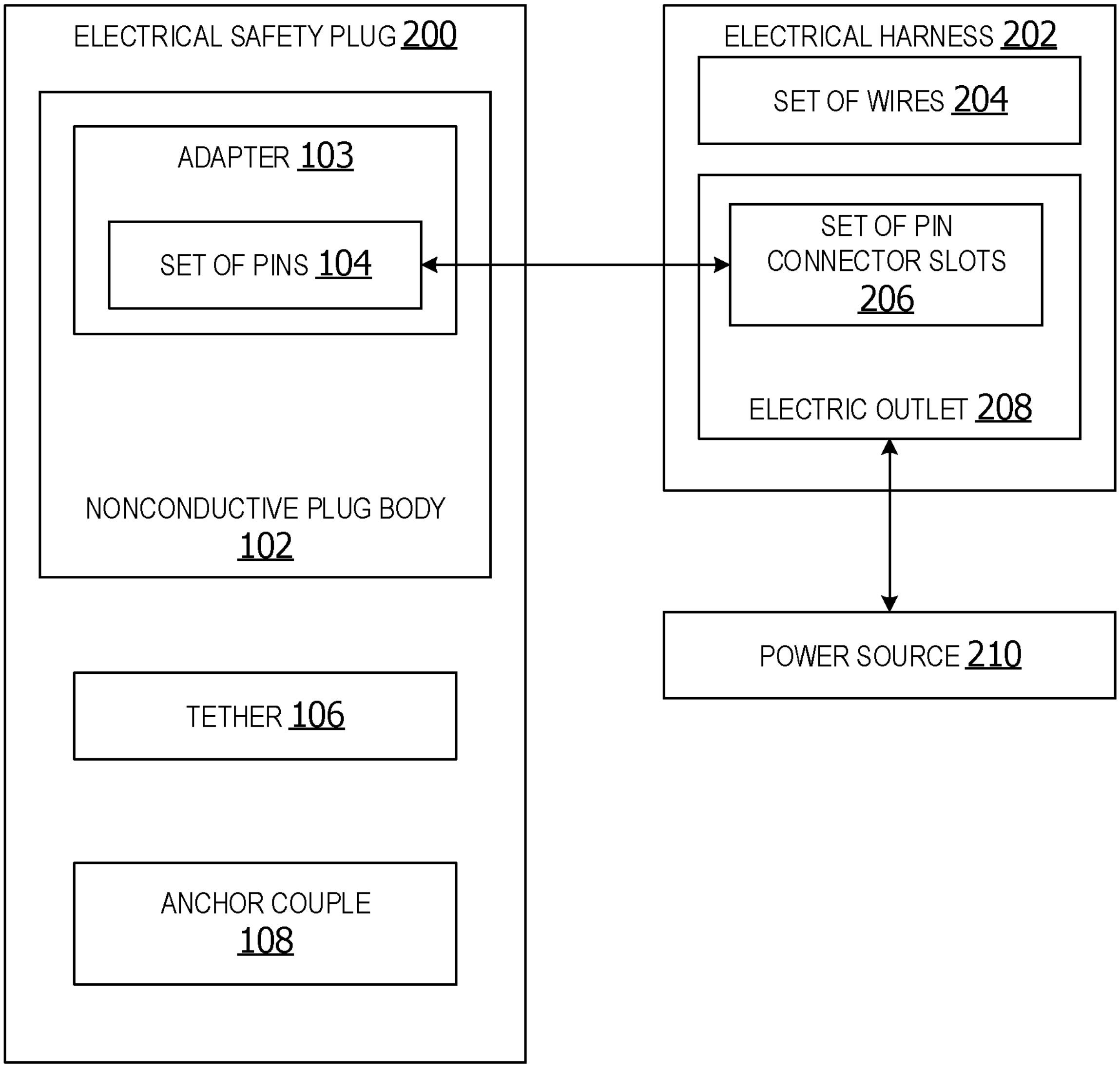
FIG. 2 is an exemplary block diagram illustrating an electrical safety plug engaging an electrical harness.

FIG. 2 is an exemplary block diagram illustrating an electrical safety plug 200 engaging an electrical harness 202. The electrical safety plug 200 is a safety plug, such as, but not limited to, the electrical safety plug 100 in FIG. 1.

The electrical harness 202, in some examples, includes a set of one or more wires 204 transmitting power, such as electrical power, from a power source 210 to the electric outlet 208. The electric outlet 208 includes a set of pin connector slots 206 having one or more pin connector slots for engaging one or more pins in the set of pins 214 on the electrical safety plug 200.

In some examples, if the set of pin connector slots 206 includes two slots, the electrical safety plug 200 used to connect to the electric outlet 208 also includes two pins. Likewise, if the set of pin connector slots 206 includes three slots on the female end of the outlet, the electric safety plug 200 includes three pins configured and arranged (spaced and sized) to fit within the cavity defined inside each pin connector slot.

Figure 3:
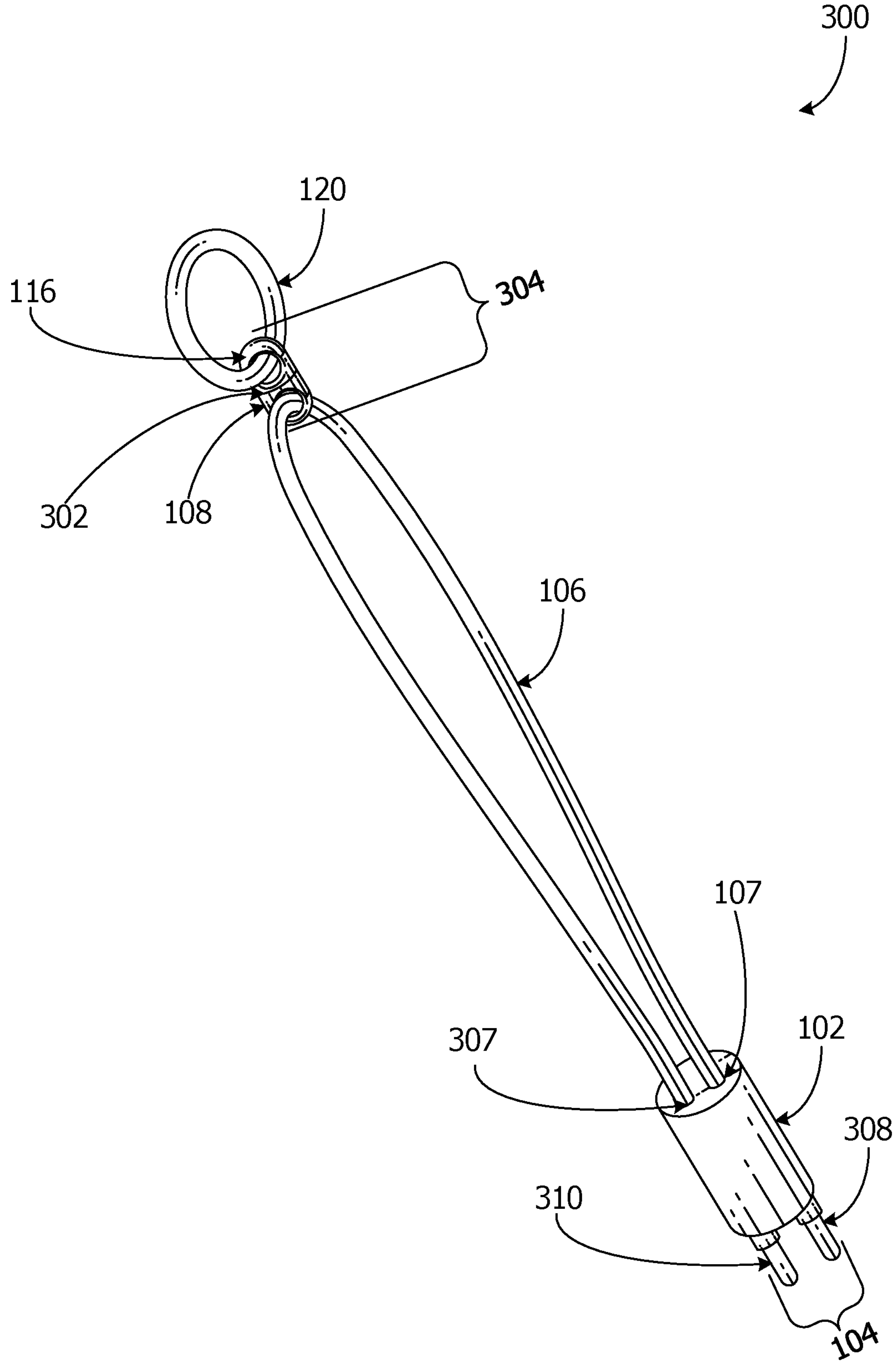
FIG. 3 is an exemplary block diagram illustrating an electrical safety plug including a pair of interlocking devices connecting a pair of couplers.

FIG. 3 is an exemplary block diagram illustrating an electrical safety plug 300 including a pair of interlocking devices 302 connecting a pair of couplers 304. The electrical safety plug 300 is a safety plug, such as, but not limited to, the electrical safety plug 100 in FIG. 1 and/or the electrical safety plug 200 in FIG. 2.

The electrical safety plug 300, in this example, is in a closed configuration in which the return couple 116 and the anchor couple 108 are attached via the pair of interlocking devices 302. In an open configuration, the dummy plug portion of the device attached to the lanyard is disconnected from the return couple. In other words, in an open configuration, the anchor couple is not connected or touching the return couple. The pair of interlocking devices are not in physical contact. In the closed configuration, the anchor couple 108 and the return couple 116 are joined via the pair of interlocking devices 302.

The pair of interlocking devices 302 is a set of two corresponding devices configured to removably connect the anchor couple 108 to the return couple 116. In some examples, the pair of interlocking devices 302 is a set of magnets having opposite poles such that the magnets attract or bind to each other when in proximity to each other. In other examples, the pair of interlocking devices 302 can include a threaded screw which screws into a threaded housing (threaded ends), a set of hook-and-loop fasteners, a pair of snaps, a set of one or more suction cups, or any other device for removably attaching the return couple 116 to the anchor couple 108.

The return couple 116, in some examples, includes an attachment member 120. The attachment member 120, in this non-limiting example, is a ring or tether for connecting the electrical safety plug 300 to a device. The attachment member 120 is permanently connected to the object. In other examples, the attachment member 120 is removably connected to the object.

The anchor couple 108, in this non-limiting example, is non-removably connected to the nonconductive plug body 102 via the tether 106. The nonconductive plug body 102 includes the set of pins 104 at a first end of the nonconductive plug body 102. In this example, the set of pins 104 includes a pin 308 and a pin 310.

In some examples, the electrical safety plug includes a first attachment point 107 and a second attachment point 307 at the second end of the nonconductive plug body 102 which is opposite to the first end of the nonconductive plug body. The first end of the tether connects to the plug body at the first attachment point 107. The second end of the tether connects to the plug body at the second attachment point 307.

Figure 4:
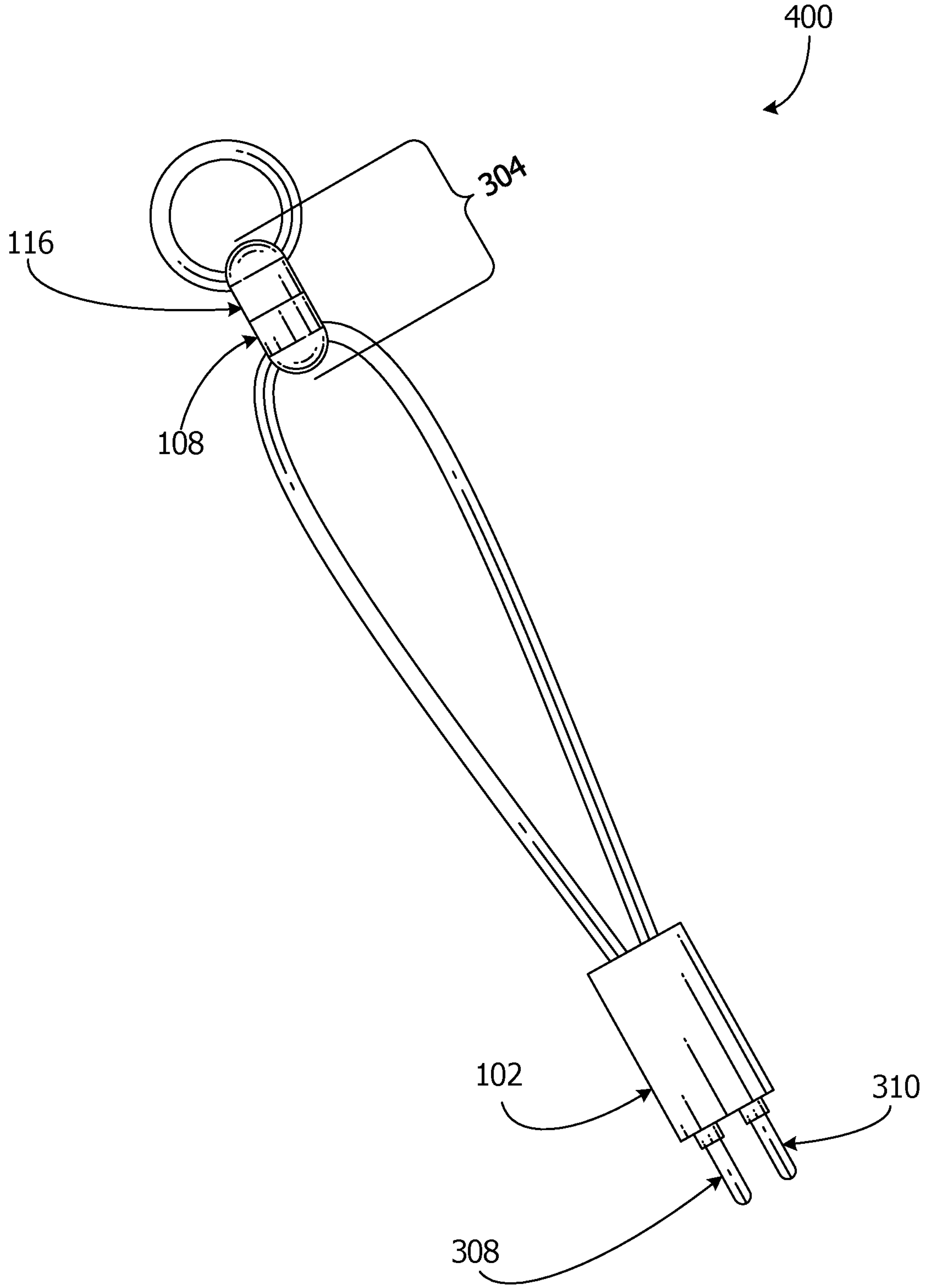
FIG. 4 is an exemplary block diagram illustrating an electrical safety plug including an anchor couple and a return couple.

FIG. 4 is an exemplary block diagram illustrating an electrical safety plug 400 including an anchor couple 108 and a return couple 116. The electrical safety plug 400 is a safety plug, such as, but not limited to, the electrical safety plug 100 in FIG. 1 and/or the electrical safety plug 200 in FIG. 2. The pair of couplers 304 in this example are engaged together such that the pair of couplers 304 are removably connected together.

Figure 5:
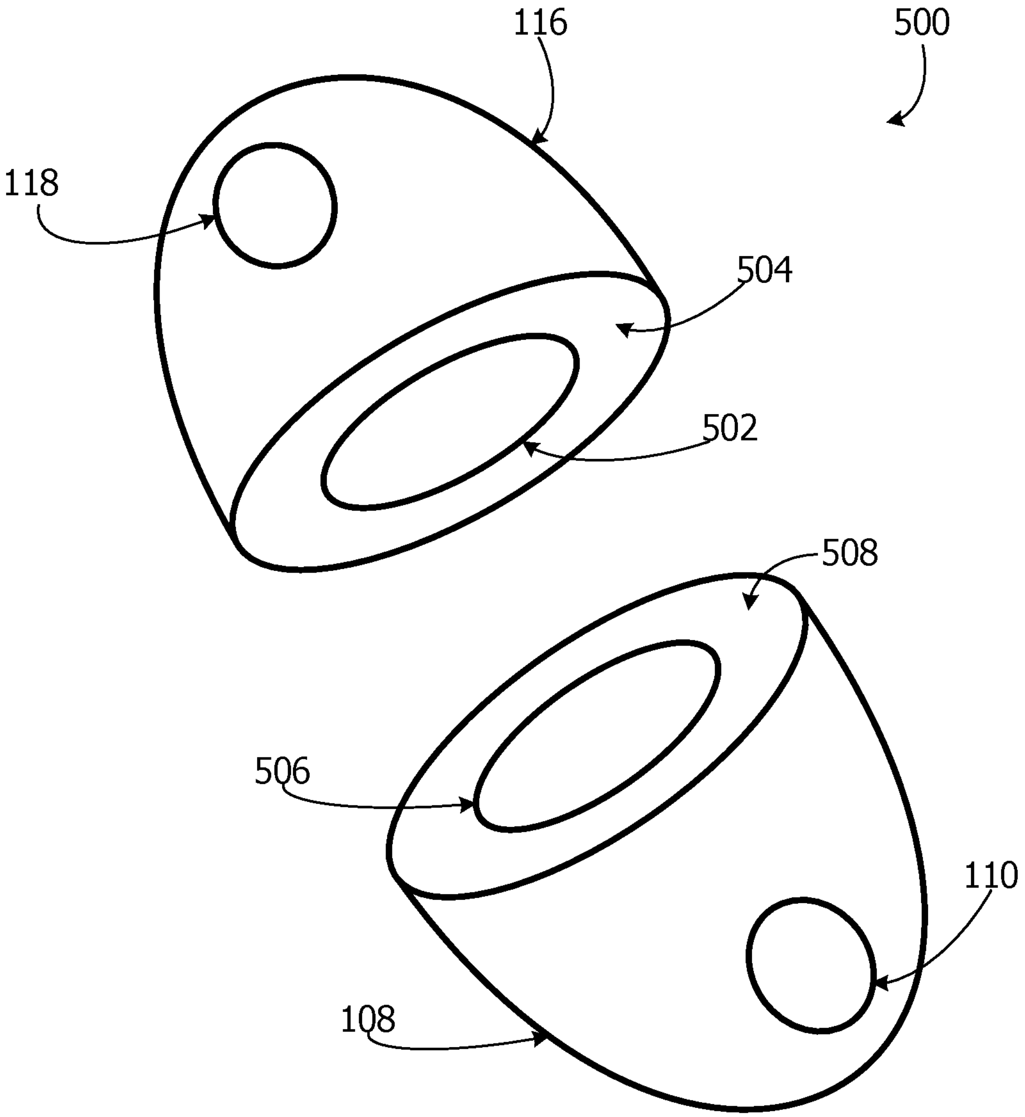
FIG. 5 is an exemplary block diagram illustrating a pair of couplers.

FIG. 5 is an exemplary block diagram illustrating a pair of couplers 500. The pair of couplers 500 is a set of two couplers, such as, but not limited to, the pair of couplers 304 in FIG. 3.

The pair of couplers 304, in some examples, includes the return couple 116 and the anchor couple 108. In this example, the anchor couple 108 and the return couple 116 are shown detached from each other. In other words, the interlocking devices are not engaged to connect the return couple to the anchor couple in this example.

In some examples, the set of interlocking devices includes a magnet 502 on an interior surface 504 of the return couple 116 and a magnet 506 associated with the interior surface 508 of the anchor couple 108. The magnets may be partially embedded within an interior portion of a couple, attached to the outer surface of the couple or otherwise attached to the couple.

A tether connection aperture 110 in the anchor couple 108 forms an aperture. A tether loops through the aperture to connect the anchor couple 108 to the nonconductive plug body. An attachment connector aperture 118 in the return couple 116 defines an aperture through which an attachment member may be threaded.

Figure 6:
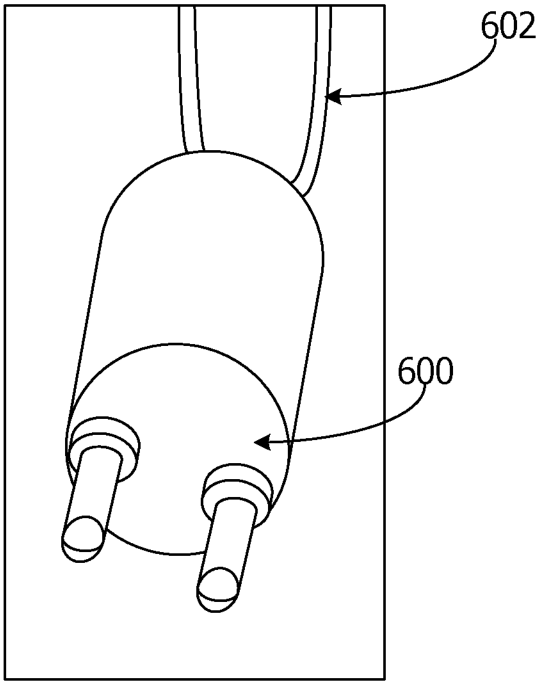
FIG. 6 is an exemplary block diagram illustrating a nonconductive plug body including a set of two pins.

FIG. 6 is an exemplary block diagram illustrating a nonconductive plug body 600 including a set of two pins. The nonconductive plug body 600 is a plug body composed of a nonconductive substance, such as, but not limited to, the nonconductive plug body 102 in FIG. 1.

In this non-limiting example, the set of pins includes two pins. The tether 106 is a loop of string, nylon, cord, rope, insulated wire or another type of material. The tether 106 connects to one end of the nonconductive plug body 600. The set of pins is connected to the opposing end of the nonconductive plug. In this example, the tether 106 includes a loop in which two ends of the tether connect to the end of the plug.

Figure 7:
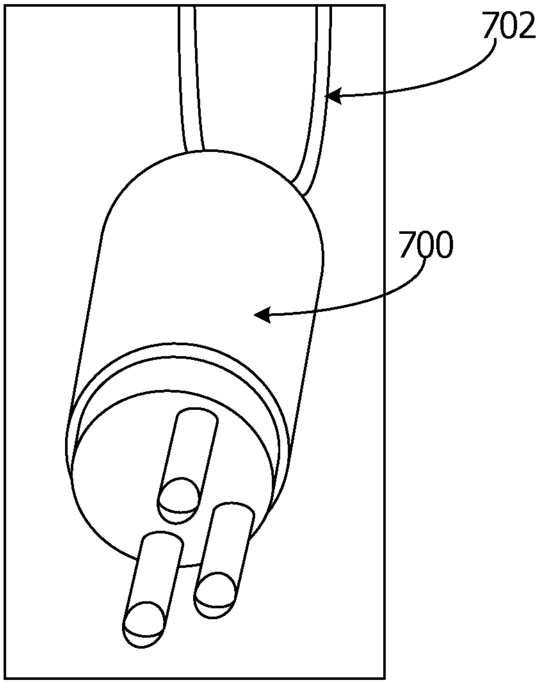
FIG. 7 is an exemplary block diagram illustrating a nonconductive plug body including a set of three pins.

FIG. 7 is an exemplary block diagram illustrating a nonconductive plug body 700 including a set of three pins. The nonconductive plug body 700 is a plug body composed of a nonconductive substance, such as, but not limited to, the nonconductive plug body 102 in FIG. 1 and/or the nonconductive plug body 700 in FIG. 7.

The set of pins in this example includes three pins. The set of three pins are connected to one end of the nonconductive plug body 700.

The tether 702 is an attachment member, such as, but not limited to, the tether 106 in FIG. 1. The tether 702 is connected to the opposing end of the nonconductive plug. In this example, the tether 702 is a single strand or single end of the tether that connects to at least a portion of the nonconductive plug body 700.

Figure 8:
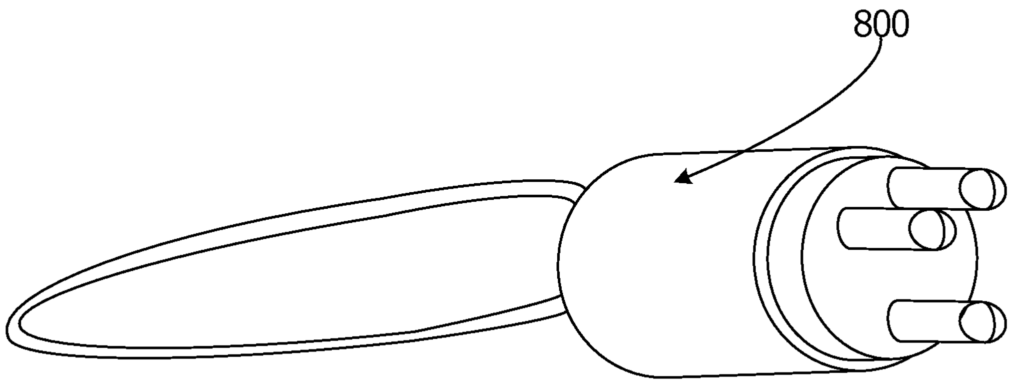
FIG. 8 is an exemplary block diagram illustrating an electrical safety plug having a tether and a set of three pins.

FIG. 8 is an exemplary block diagram illustrating an electrical safety plug 800 having a looped tether and a set of three pins. The electrical safety plug is a safety plug, such as, but not limited to, the electrical safety plug 100 in FIG. 1 and/or the electrical safety plug 200 in FIG. 2. In this non-limiting example, both ends of the tether connect to a base or end of the nonconductive plug body of the electrical safety plug 800. The set of pins, in this example, includes three pins.

Figure 9:
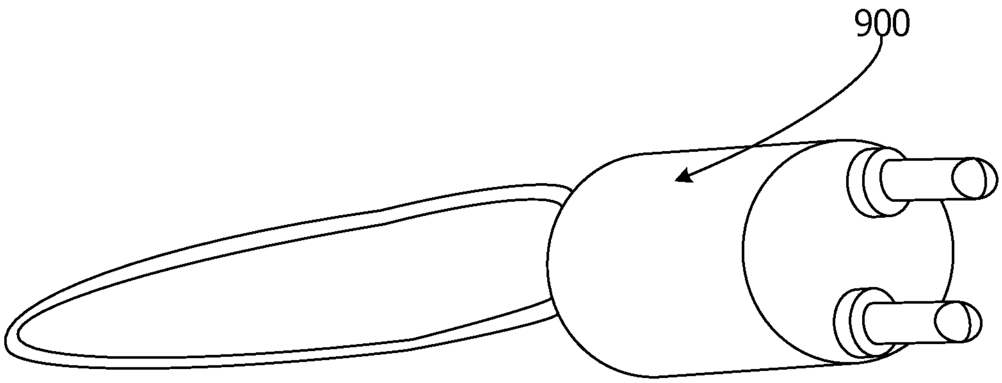
FIG. 9 is an exemplary block diagram illustrating an electrical safety plug having a tether and a set of two pins.

Referring to FIG. 9, an exemplary block diagram is shown illustrating an electrical safety plug 900 having a looped tether 902. The set of pins, in this example, includes two pins.

Figure 10:
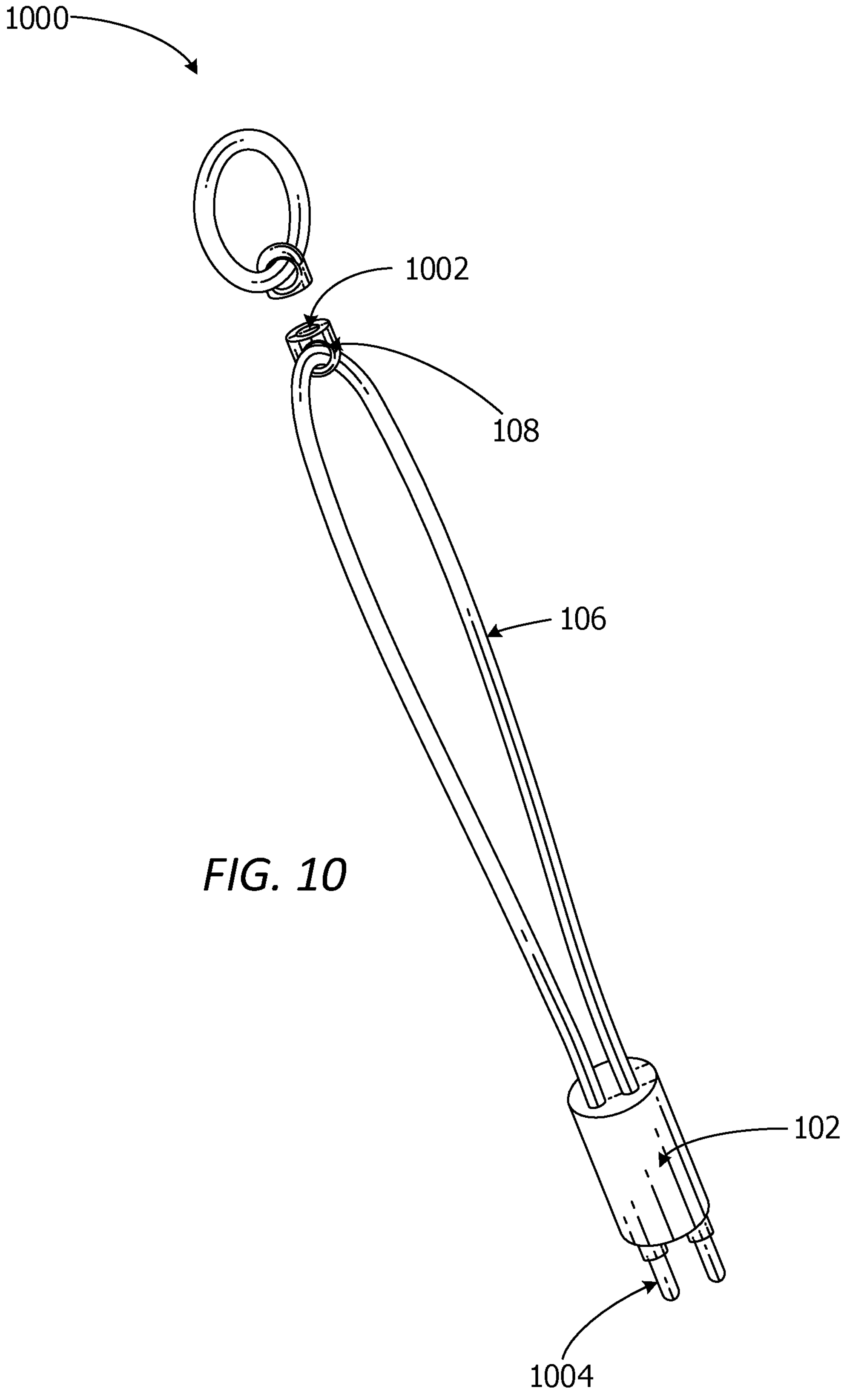
FIG. 10 is an exemplary block diagram illustrating an electrical safety plug including an anchor couple having a magnetic interlock device.

FIG. 10 is an exemplary block diagram illustrating an electrical safety plug 1000 including an anchor couple 108 having a magnetic interlock device 1002. The electrical safety plug 1000 is a safety plug, such as, but not limited to, the electrical safety plug 100 in FIG. 1 and/or the electrical safety plug 200 in FIG. 2.

The magnetic interlock device 1002 is a device in a set of interlocking devices for removably connecting the anchor couple 108 to the return couple 116 on the electrical safety plug 1000. The magnetic interlock device 1002, in this example, includes one or more magnets configured to attract to one or more other magnets associated with the return couple 116 or a metal material associated with a member of a display case being cleaned or serviced, such as a side wall of a device, base plate (bottom member) or other metal structure. In some examples, the side wall is a side wall of a display case or other device.

In some examples, a tether 106 connects the anchor couple 108 to the nonconductive plug body. The nonconductive plug body 102 includes a set of pins. In this example, the set of pins includes two pins. However, in other examples, the set of pins can include a single pin, three pins, or any other number of pins.

Figure 11:
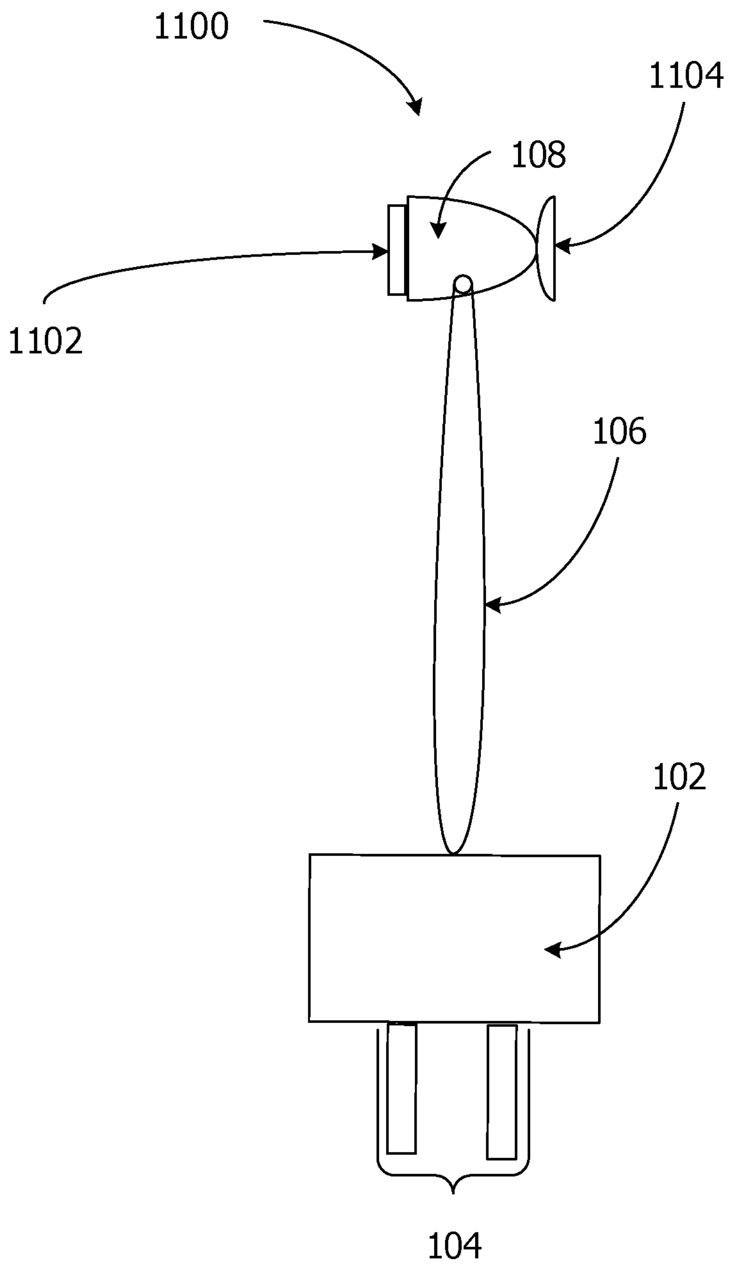
FIG. 11 is an exemplary block diagram illustrating an electrical safety plug including an anchor couple having a suction device for attaching to a sidewall.

FIG. 11 is an exemplary block diagram illustrating an electrical safety plug 1100 including an anchor couple 108 having a suction device 1104 for attaching to a sidewall. The electrical safety plug 1100 is a safety plug, such as, but not limited to, the electrical safety plug 100 in FIG. 1 and/or the electrical safety plug 200 in FIG. 2.

In this example, the safety plug 1100 includes a magnet 1102 for connecting to the return couple and/or the metal side wall or other metal structure. In other examples, the electrical safety plug 1000 includes a suction device 1004 for removably attaching the anchor couple to a plastic side wall or other non-metal structure, such as, but not limited to, one or more rubber suction cups. In still other examples, the anchor couple includes both a set of magnets and a set of suction devices for adhering to both metal and non-metal surfaces.

In other examples, the tether 106 connects the anchor couple 108 to the nonconductive plug body 102. The electrical safety plug 1100 includes a set of pins 104. The set of pins, in this example, includes two pins. However, the examples are not limited to two pins. In other examples, the set of pins 104 can include a single pin as well as three or more pins.

Figure 12:
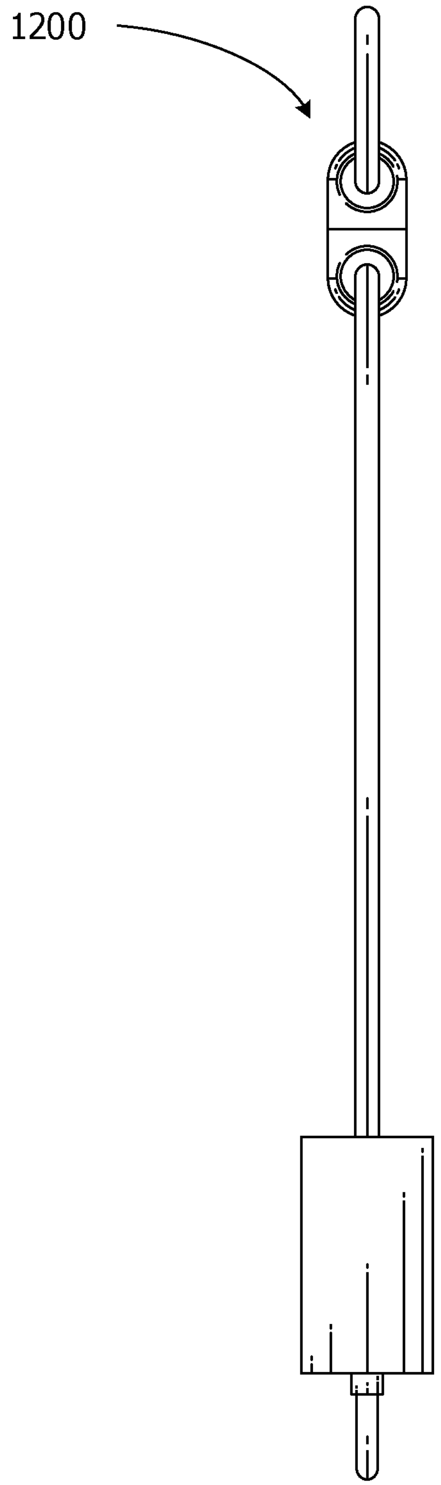
FIG. 12 is an exemplary block diagram illustrating a side view of an electrical safety plug having a single pin.

FIG. 12 is an exemplary block diagram illustrating a side view of an electrical safety plug 1200 having a single pin. The electrical safety plug 1200 is a safety plug, such as, but not limited to, the electrical safety plug 100 in FIG. 1 and/or the electrical safety plug 200 in FIG. 2.

Figure 13:
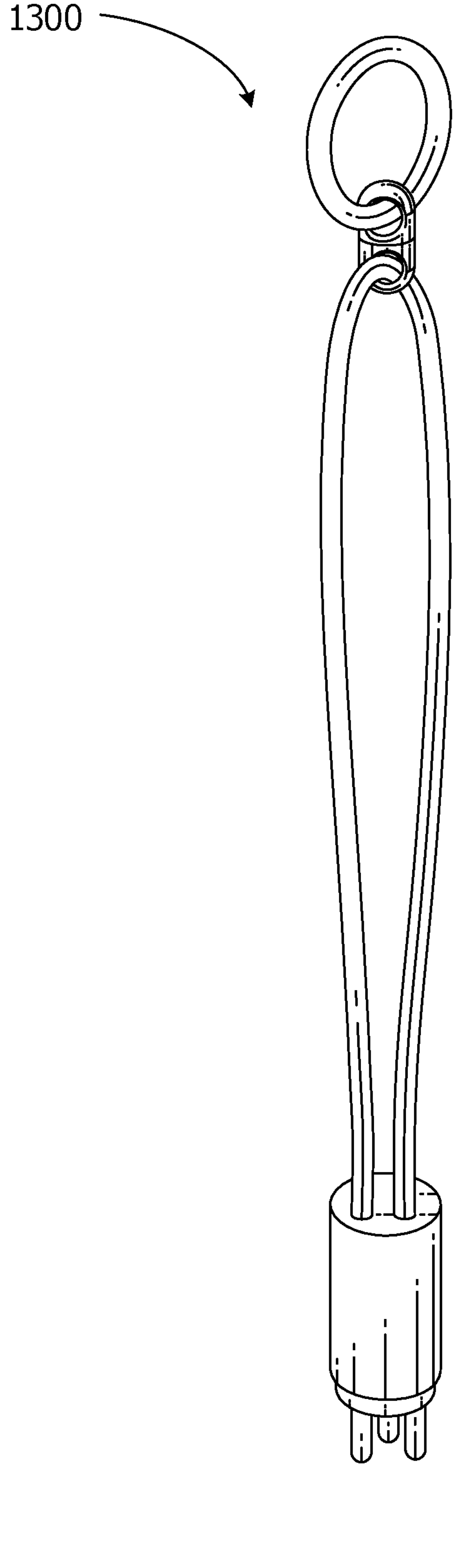
FIG. 13 is an exemplary block diagram illustrating an electrical safety plug having the anchor couple attached to the return couple.

FIG. 13 is an exemplary block diagram illustrating an electrical safety plug 1300 having the anchor couple attached to the return couple. The electrical safety plug 1200 is a safety plug, such as, but not limited to, the electrical safety plug 100 in FIG. 1 and/or the electrical safety plug 200 in FIG. 2.

Figure 14:
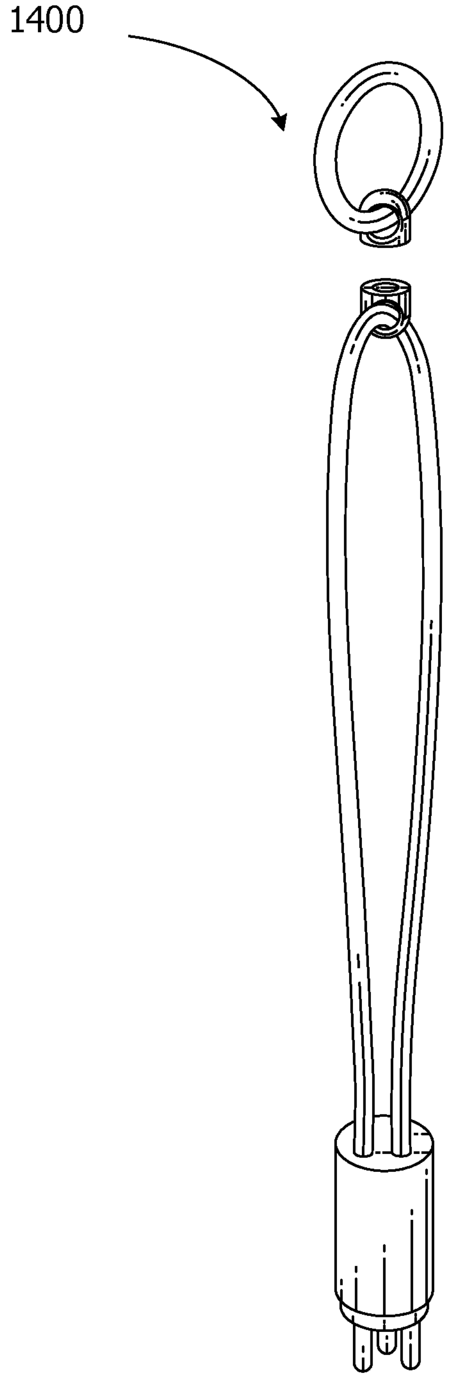
FIG. 14 is an exemplary block diagram illustrating an electrical safety plug having the anchor couple detached from the return couple.

FIG. 14 is an exemplary block diagram illustrating an electrical safety plug 1400 having the anchor couple detached from the return couple. The electrical safety plug 1400 is a safety plug, such as, but not limited to, the electrical safety plug 100 in FIG. 1 and/or the electrical safety plug 200 in FIG. 2.

Figure 15:
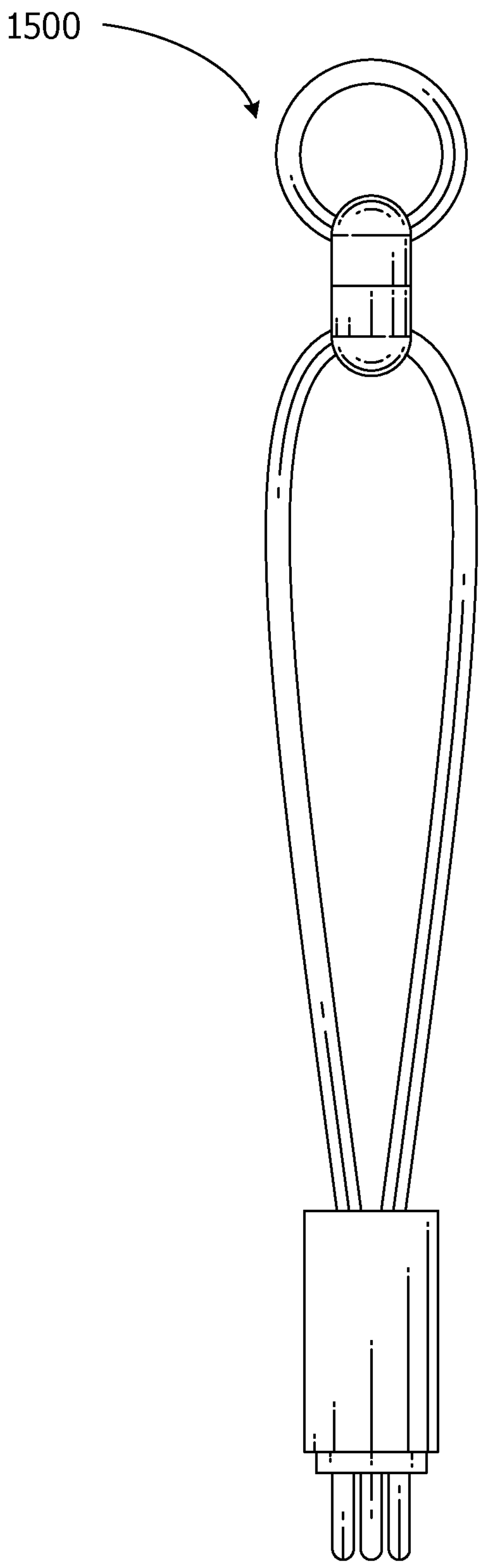
FIG. 15 is an exemplary block diagram illustrating a front view of an electrical safety plug having a set of three pins.

FIG. 15 is an exemplary block diagram illustrating a front view of an electrical safety plug 1500 having a set of three pins. The electrical safety plug 1500 is a safety plug, such as, but not limited to, the electrical safety plug 100 in FIG. 1 and/or the electrical safety plug 200 in FIG. 2.

Figure 16:
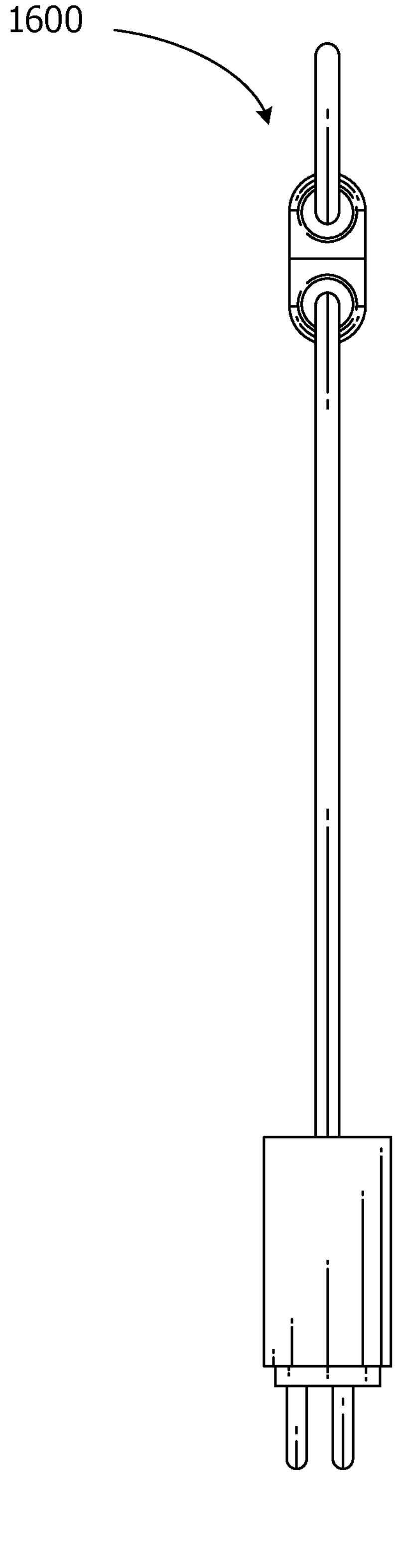
FIG. 16 is an exemplary block diagram illustrating a side view of an electrical safety plug having a set of two pins.

FIG. 16 is an exemplary block diagram illustrating a side view of an electrical safety plug 1600 having a set of two pins. The electrical safety plug 1600 is a safety plug, such as, but not limited to, the electrical safety plug 100 in FIG. 1 and/or the electrical safety plug 200 in FIG. 2.

Figure 17:
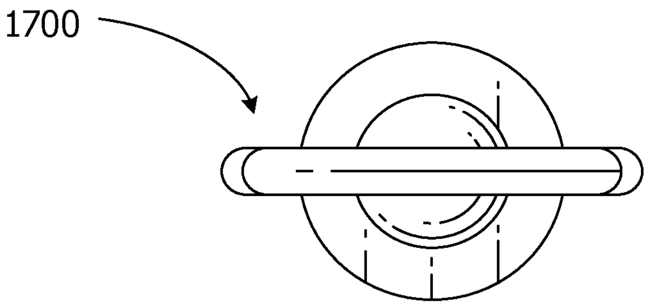
FIG. 17 is an exemplary block diagram illustrating a top view of a couple device.

FIG. 17 is an exemplary block diagram illustrating a top view of a couple device 1700. The couple device 1700 is a couple in a pair of couples, such as, but not limited to, the anchor couple 108 in FIG. 1 and/or the return couple 116 in FIG. 1.

Figure 18:
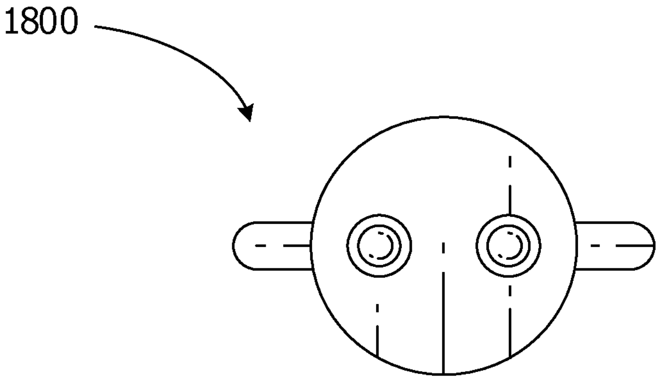
FIG. 18 is an exemplary block diagram illustrating a bottom view of a couple device having a set of two magnets.

FIG. 18 is an exemplary block diagram illustrating a bottom view of a couple device 1800 having a set of two magnets. Each magnet in the set of magnets is a magnetic interlock device for removably attaching the couple device to another couple device in the pair of couples, such as, but not limited to, the magnetic interlock device 1002 in FIG. 10. A magnet in the set of magnets may include any type of magnetic device, such as, but not limited to, the magnet 502 in FIG. 5, the magnet 506 in FIG. 5 and/or the magnet 1102 in FIG. 11.

Figure 19:
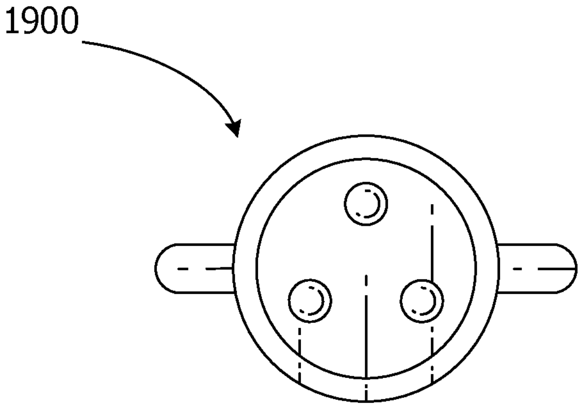
FIG. 19 is an exemplary block diagram illustrating a bottom view of a couple device having a set of three magnets.
Figure 20:
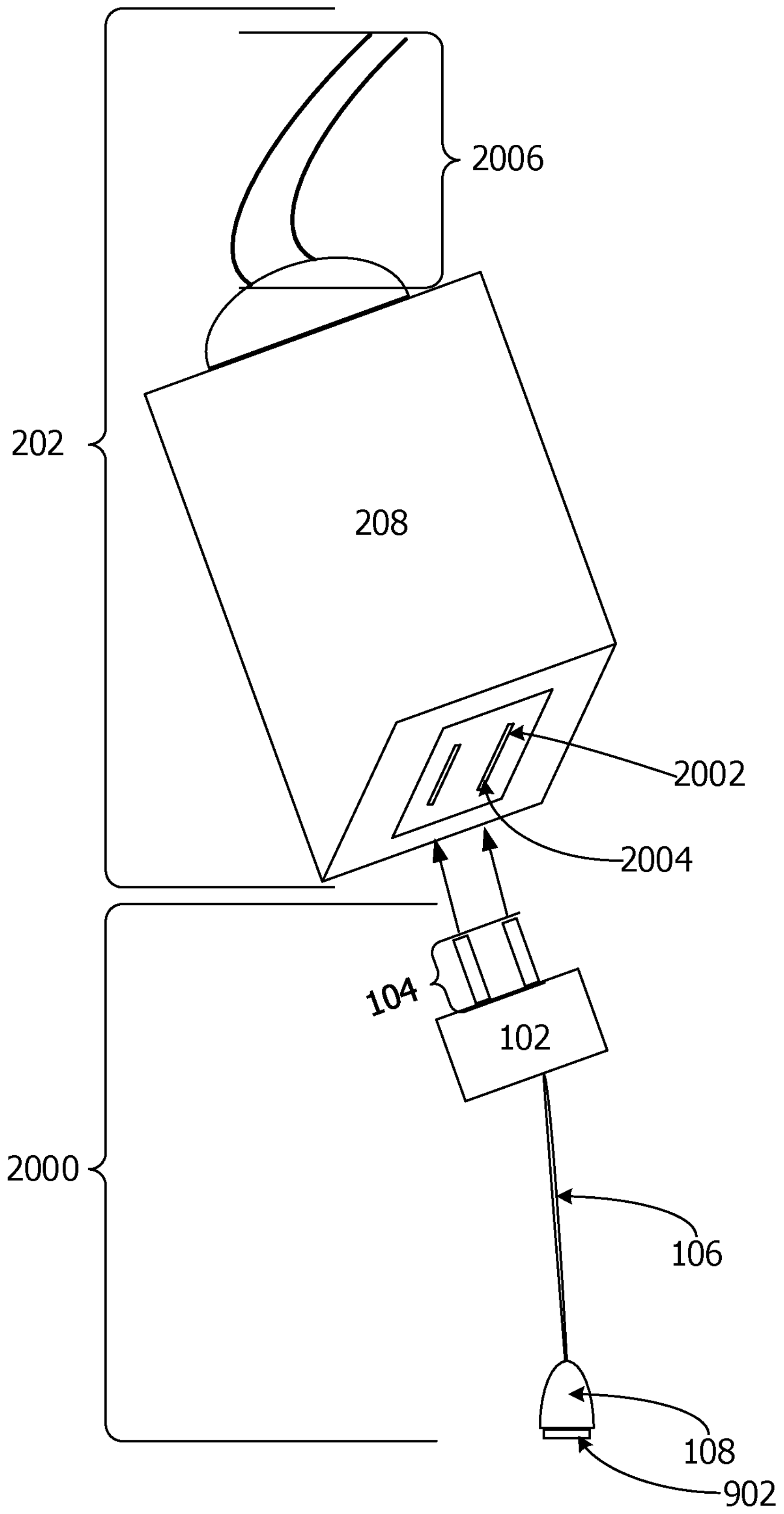
FIG. 20 is an exemplary block diagram illustrating a safety plug having a set of pins configured to engage a set of slots on an electric plug.

FIG. 19 is an exemplary block diagram illustrating a bottom view of a couple device 1900 having a set of three magnets. Each magnet in the set of three magnets is a magnetic interlock device for removably attaching the couple device to another couple device in the pair of couples, such as, but not limited to, the magnetic interlock device 1002 in FIG. 10. A magnet in the set of magnets may include any type of magnetic device, such as, but not limited to, the magnet 502 in FIG. 5, the magnet 506 in FIG. 5 and/or the magnet 1102 in FIG. 11. FIG. 20 is an exemplary block diagram illustrating a safety plug having a set of pins configured to engage a set of slots on an electric FIG. 20 is an exemplary block diagram illustrating an electrical safety plug 2000 having a set of pins configured to engage a set of slots 2002 on an electric outlet 208. Each slot in the set of slots defines a cavity 2004. A pin in the set of pins 104 is configured to conform to the cavity 2004 defined by a slot in the set of slots.

In some non-limiting examples, the magnetic interlock device 1002 of the anchor couple 108 removably attaches to a side wall or base member. The tension on the tether 106 pulls the electrical harness 202, including the set of wires 2006 and electric outlet 208, out of the user's work area.

Figure 21:
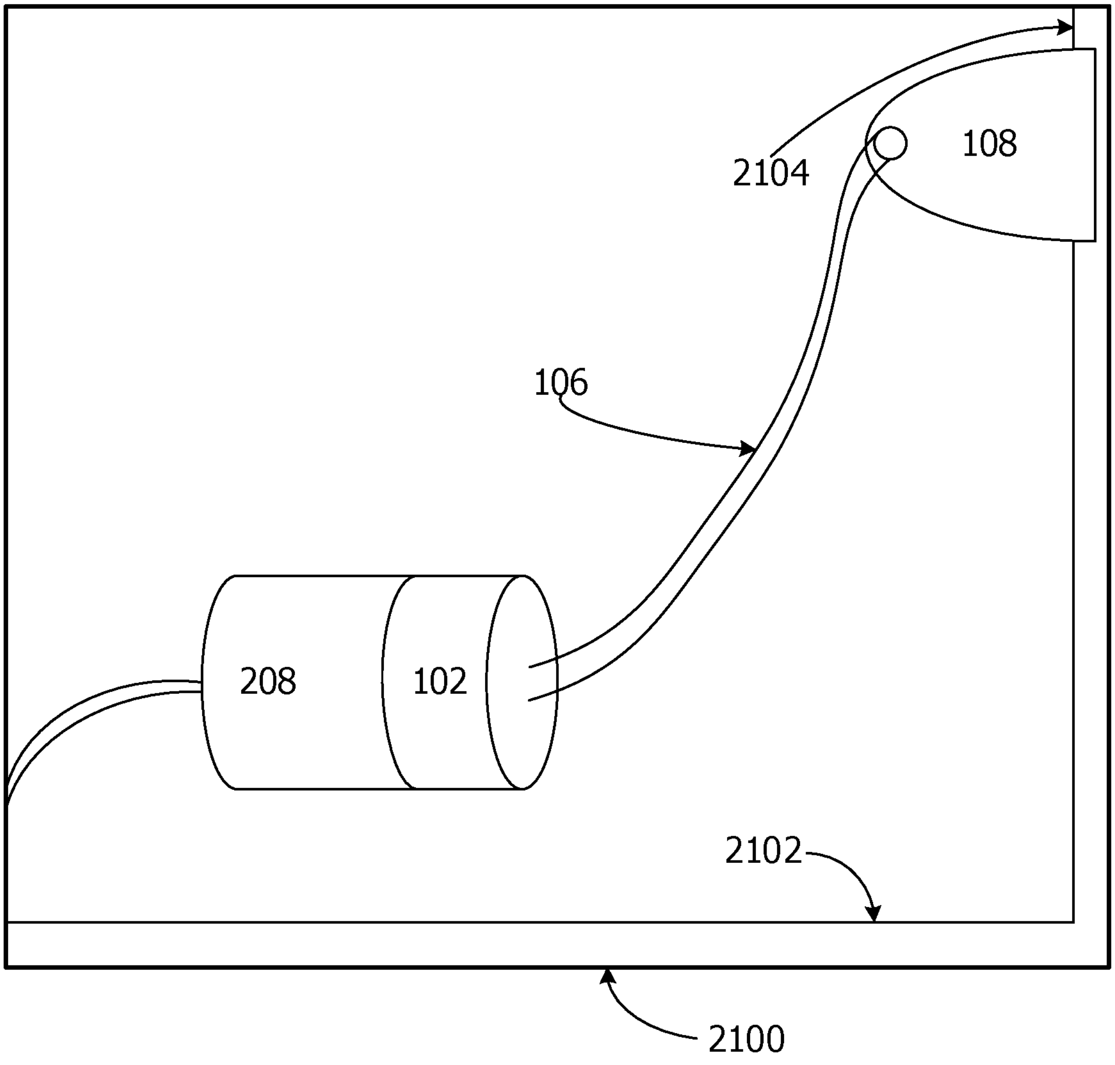
FIG. 21 is an exemplary block diagram illustrating an electrical wiring harness engaged with an electrical safety plug anchored to a side wall via a magnet.

FIG. 21 is an exemplary block diagram illustrating an electrical wiring harness engaged with an electrical safety plug 200 anchored to a side member 2104 via a magnet. The side member may also be referred to as a side wall. The tension on the tether 106 lifts or pulls the electric outlet 208 (electrical harness) away from the area where the user is spraying water or cleaning fluid to clean the base member 2102 of the case 2100. The case 2100 can include a refrigerated display case, a freezer case, or any other type of case for storing temperature-controlled items, such as perishable items.

Figure 22:
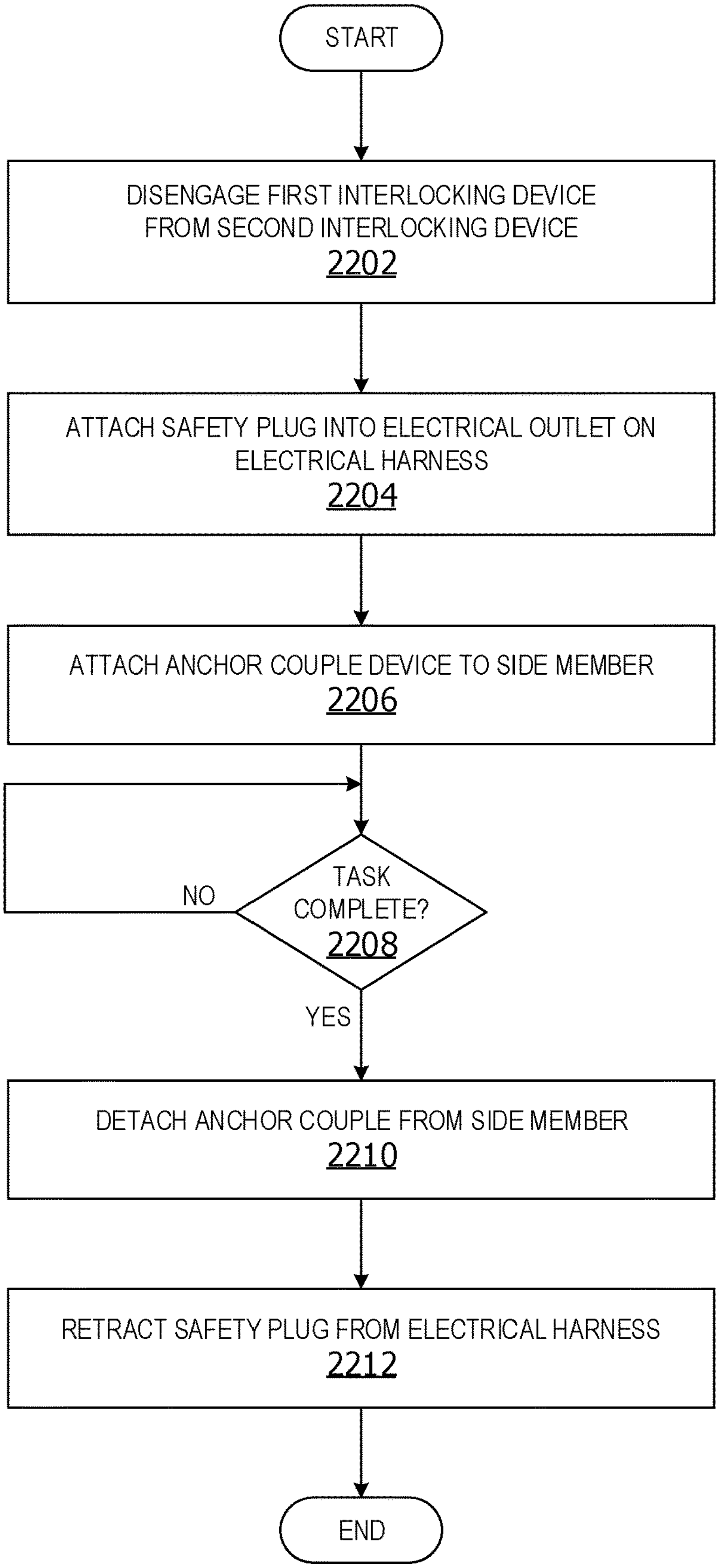
FIG. 22 is an exemplary flow chart illustrating operation of the computing device to engage an electrical safety plug with an electric plug.

FIG. 22 is an exemplary flow chart illustrating operation of the computing device to engage an electrical safety plug with an electric plug. The process begins when a first interlocking device associated with an anchor couple is disengaged from a second interlocking device associated with a return couple at 2202. In some examples, the interlocking devices are magnets and the interlocking devices are disengaged by manually pulling the magnets apart. The safety plug is attached into an electrical outlet associated with an electrical harness at 2204. The anchor couple device is attached to a side member 2206. The side member, in this example, is a side of a refrigerated display case or a freezer display case. In other examples, the side member can be a side of any type of container, housing, case, or other structure being cleaned or serviced. The anchor couple supports the safety plug and the electrical harness in an elevated or displaced configuration moving the electrical harness away from a work area where the cleaning or service task is being performed. When the cleaning or service task is completed at 2208, the anchor couple is detached from the side member at 2210. The safety plug is retracted or otherwise removed from the electrical outlet associated with the electrical harness at 2212. After removing the safety plug from the electrical outlet, the first interlocking device may be reattached to the second interlocking device to resecure the safety plug to the attachment member. The process terminates thereafter.

Additional Examples

In some examples, the electrical safety plug includes a light, such as, but not limited to, a light emitting diode (LED) light or a set of one or more LED lights. The light includes an off and on switch. The user activates the on switch to activate the light. The light can assist the user while working in a partially enclosed or poorly lit area. The one or more LED lights may be attached to the attachment member and/or the return couple of the electrical safety plug. In other examples, the one or more LED lights are attached to the nonconductive plug body and/or the anchor couple. In still other examples, the one or more LED lights are removably attached to the electrical safety plug.

In other examples, the electrical safety plug includes one or more diagnostic sensors. A diagnostic sensor included on the safety plug can include, for example, but without limitation, a voltmeter, an ammeter, an ohm meter, or other sensors for detecting whether the outlet is a live outlet having a live power source connected to it or a dead outlet, an amount of voltage running through the electrical harness, etc.

In an example scenario, when a user inserts the set of pins of the safety plug into the set of pin connector slots on an outlet, an indicator on the electrical safety plug indicates whether the outlet is live (current present) or dead (no current). An outlet may be dead if there is no power source feeding electric current to the outlet. If the outlet is live, the user leaves the safety plug engaged with the outlet and attaches the anchor coupler to the side wall or base member of the case to be cleaned. The tension on the tether connecting the anchor to the dummy plug pulls or partially lifts the electrical harness and safety plug away from an area where the user is working (performing maintenance). Maintenance may include cleaning, repairing, etc. The area where the user is working may be at or near the original location of the outlet. In other examples, the user secures the anchor to the base member to prevent the electrical harness from shifting, sliding or otherwise moving (becoming displaced) during cleaning.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A safety plug for an electrical outlet, the safety plug comprising:

an electrically nonconductive plug body;

an anchor couple comprising a first interlocking device;

a return couple comprising a second interlocking device, wherein the first interlocking device and the second interlocking device are configured to be removably engaged, wherein the first interlocking device and the second interlocking device are magnetic, and wherein the first interlocking device is further configured to magnetically engage with any magnetic surface;

an adapter removably coupled to a first end of the electrically nonconductive plug body, the adapter further comprising:

a set of pins fixedly connected to the adapter, the set of pins corresponding to a set of pin connector slots associated with the electrical outlet, wherein the safety plug is a dummy plug configured to keep the electrical outlet covered to protect from electrical discharge during a cleaning operation around the electrical outlet.

2. The safety plug of claim 1, further comprising:

a tether connected to a second end of the electrically nonconductive plug body at an attachment point.

3. The safety plug of claim 1, wherein the tether is extendable and retractable such that the length of the tether is variable, and wherein at least a portion of the tether is housed within a portion of the electrically nonconductive plug body.

4. The safety plug of claim 1, wherein a tether is connected to the anchor couple via a tether connection aperture.

5. The safety plug of claim 1, further comprising:

one or more light emitting diode (LED) lights implemented on a return couple.

6. The safety plug of claim 1, further comprising:

one or more light emitting diode (LED) lights implemented on an anchor couple.

7. The safety plug of claim 1, further comprising:

an attachment member, the attachment member connected to a return couple via an attachment connector aperture.

8. The safety plug of claim 7, further comprising:

one or more light emitting diode (LED) lights implemented on the attachment member.

9. The safety plug of claim 1, wherein an attachment member comprises a suction device.

10. The safety plug of claim 1, wherein the adapter is interchangeable such that the adapter can be removed and another adapter comprising a different set of pins can be removably coupled to the first end of the electrically nonconductive plug body, the different set of pins corresponding to a different set of pin connector slots.

11. The safety plug of claim 1, further comprising:

a diagnostic sensor, implemented on the electrically nonconductive plug body, that detects whether the electrical outlet is a live outlet having an electrical current present or a dead outlet having no electrical current present.

12. The safety plug of claim 11, further comprising:

an indicator, implemented on the electrically nonconductive plug body and communicatively coupled to the diagnostic sensor, the indicator providing an indication of the current detected by the diagnostic sensor when the safety plug is inserted into the electrical outlet.

13. The safety plug of claim 11, wherein the diagnostic sensor comprises at least one of a voltmeter, an ammeter, or an ohm meter.

14. The safety plug of claim 1, further comprising:

one or more light emitting diode (LED) lights implemented on the electrically nonconductive plug body.

* * * * *